June 15, 1926.
J. H. DONAHUE
1,588,877
WATER SUPPLY REGULATOR
Filed August 25, 1925    2 Sheets-Sheet 2
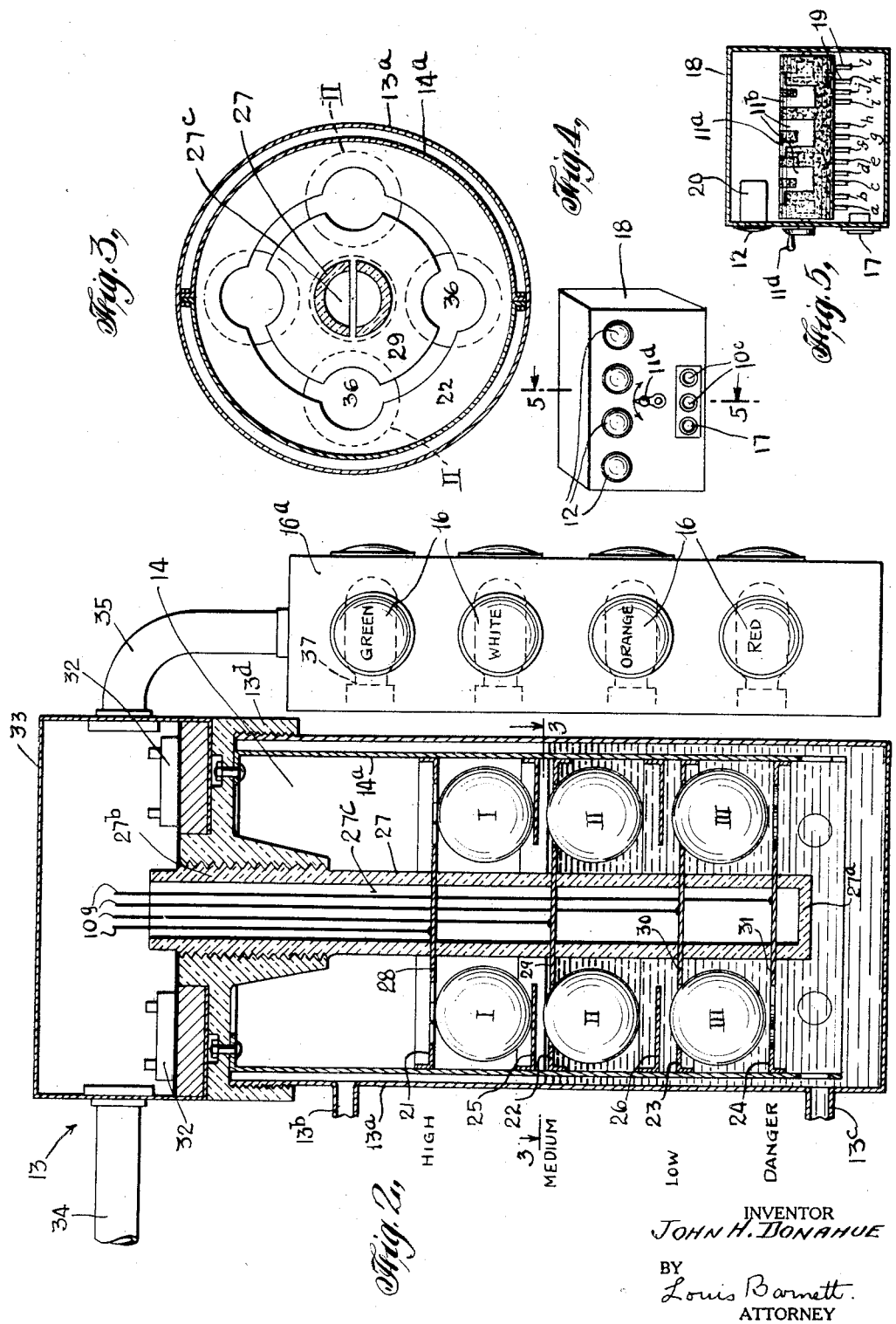

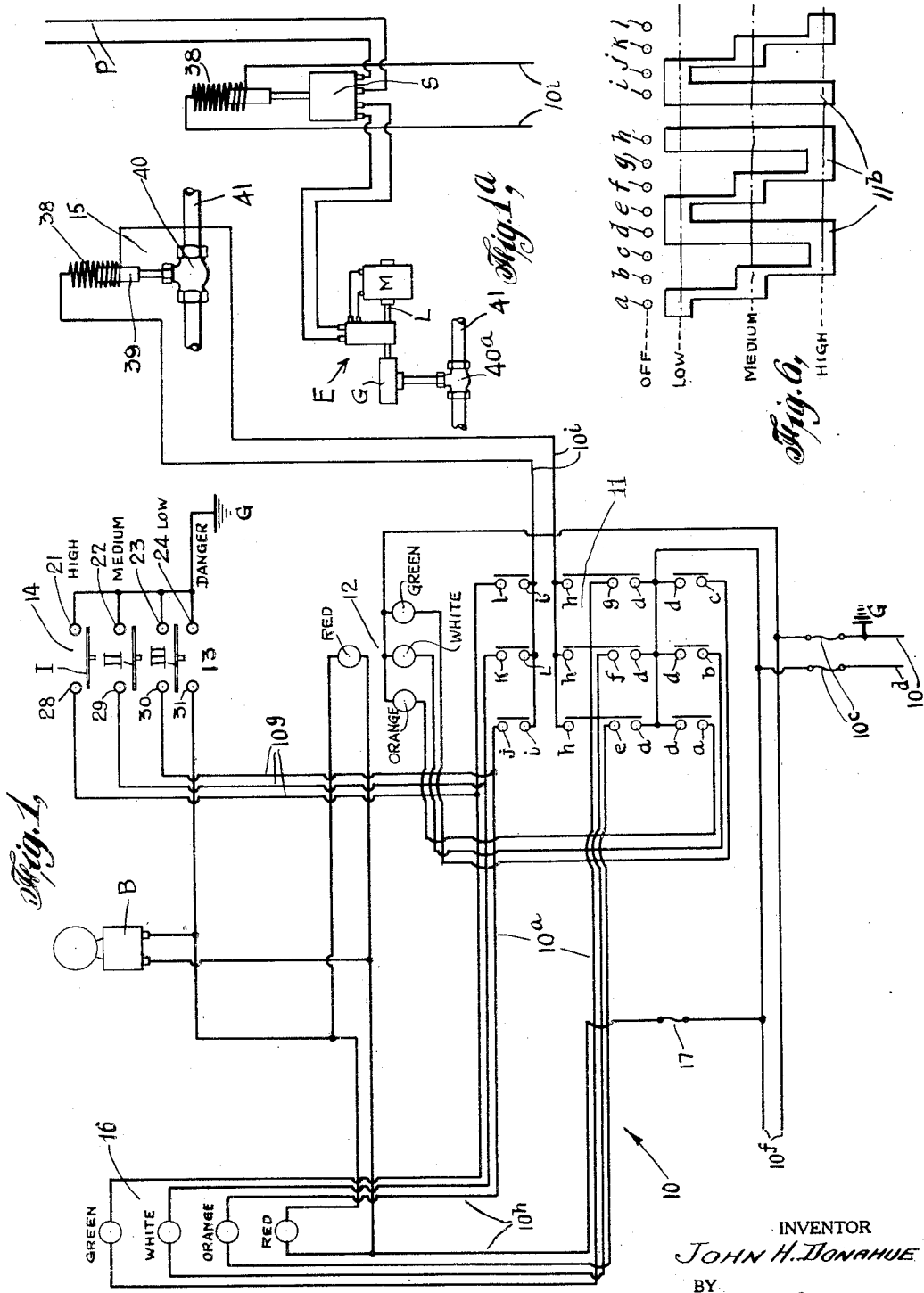

Patented June 15, 1926.

1,588,877

UNITED STATES PATENT OFFICE.

JOHN H. DONAHUE, OF NEW ORLEANS, LOUISIANA.

WATER-SUPPLY REGULATOR.

Application filed August 25, 1925. Serial No. 52,337.

This invention relates to water supply regulators for boilers, tanks and the like. More particularly the invention is directed to an improved electrically-operated, automatically-controlled, feed-water regulator equipment.

One object of the invention is to provide a feed-water regulator equipment comprising an electric wiring system of novel design and arrangement for automatically operating and controlling a feed-water valve to correspond with a predetermined, desired water level.

Another object of the invention is to provide a feed-water regulator equipment of the character described, having a water column constructed to incorporate an improved electric circuit making and breaking portion for operating a feed-water control means.
Another object of the invention is to provide in a feed-water regulator equipment of the character described, an improved means for indicating the changes in the operation at the water column, at the switching means, and at any other number of places desired.

A further object of the invention is to provide an equipment of the character described comprising relatively simple parts, which are comparatively inexpensive to manufacture and install, practical in operation, and efficient to a high degree for the purpose described.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawing, in which is shown one of the various possible illustrative embodiments of this invention:—

Fig. 1 is a diagrammatic view of the electrically-operated feed-water regulating system embodying the invention.

Fig. 1ª is a diagrammatic view of the portion of the system shown in Fig. 1 in which the solenoid is connected to operate a motor-driven feed valve.

Fig. 2 is a cross-sectional view of the water column showing the interior construction and an elevational view of the casing for enclosing the signal lights indicating the water level.

Fig. 3 is a cross-sectional view taken on line 3—3 in Fig. 2.

Fig. 4 is a perspective view of fuse and switch box for setting the level at which the system is to operate.

Fig. 5 is a sectional view taken on line 5—5 in Fig. 4 and,

Fig. 6 is a view showing a development of controller bars of the switch shown in Fig. 5.

Referring in detail to the drawing, 10 denotes a complete wiring system for a feed-water regulating equipment embodying the invention which is seen to include a manually actuated switching means 11 for setting the water level at which the equipment is to operate, signal lamps 12 for indicating the setting of said means, a water column 13 having an electric circuit "make and break" device 14 of novel construction connected to a feed-water control means 15, and semaphore lights 16 for indicating the changes of the level of the water in the water column. These apparatuses, which may be arranged and installed as separate units in any convenient manner about the power plant, are connected together by suitable conductor wires 10ª preferably encased in conduit pipes, "Bx," or moldings (not shown) in the well understood manner. Electric power for operating the system may be supplied through feeder conductors 10ᵈ from any suitable source (not shown) preferably being 110–220 volts, either alternating or direct current. Main fuses 10ᶜ are provided for the conductors 10ᵈ, and one of said conductors is preferably grounded as at G. Where a plurality of systems 10 are installed the feed conductors 10ᵈ may be extended as at 10ᶠ for supplying power to two or more systems.

If desired the switching means 11, fuses 10ᶜ, a fuse 17, the purpose of which will hereinafter appear, and signal lamps 12 may all be assembled in a switch box 18 as shown in Fig. 4. The switching means 11 may be of any suitable construction and is shown in Figs. 4, 5 and 6 to comprise a cylinder form of controller 11ª having mounted thereon bars 11ᵇ, which are adapted to contact with fingers 19 on rotating of said controller. Said fingers are connected in circuit with proper conductor wires of the system as shown in Figs. 1, 5 and 6 and there is provided on the front side of the box 18 a handle 11$^d$ for manipulating said controller. A detent (not shown) for retaining the controller 11$^a$ in a set position may be included in the construction in the well understood manner.

The fuses 10$^c$ and 17 may preferably be of the enclosed plug or cartridge type and are arranged in the box 18 so they may be easily and conveniently replaced. A separate compartment is provided in said box for holding a suitable lamp socket 20 for mounting each of the signal lights 12, said lights being arranged to show through colored windows a "bull's eye" fitted in front side of the box 18, denoted in Figs. 1 and 5 as green, white, orange and red, the first three for indicating the setting of the switching means corresponding with the high, medium and low water level, respectively, and the last for showing the danger level. The operation of the signal lights 12 will hereinafter be described.

The water column 13 may be positioned adjacent the usual water gage (not shown) if desired, and may be constructed to operate on any desired number of divisions of the water level between the high or maximum and the low or minimum level. As seen from Figs. 2 and 3, said column 13 has a high, medium, low and danger operating level and may comprise a cylindrical casing 13$^a$ having a suitable upper and lower pipe connection 13$^b$ and 13$^c$, respectively, and a closure cap 13$^d$ screwed or otherwise tightly fitted thereon. Enclosed in said casing 13$^a$ and preferably suspended from the cap 13$^d$ is the electric circuit "make and break" device 14 which is of the float ball type. Said device 14 may have a cylindrical, perforated, current-carrying outer shell 14$^a$ which is formed with spaced parallel annular contact plates 21, 22, 23 and 24, one for each of the high, medium, low and danger levels, respectively, and which has annular shaped stop members or shelves 25 and 26 positioned to extend parallel to, over and adjacent the plates 22 and 23, respectively.

Extending axially through the shell 14$^a$ and said plates and shelves, there is a tubular member 27 formed of any suitable waterproof insulating material, such as glass, porcelain, bakelite or the like material, said member having its lower end 27$^a$ closed and its upper end 27$^b$ screwed or otherwise tightly secured to extend through the cap 13$^d$ as shown in Fig. 2. Concentrically disposed within and aligned with the contact plates 21, 22, 23 and 24, there is embedded in said member 27, parallelly spaced annular contact plates 28, 29, 30 and 31 respectively. Said contact plates, tubular member 27 and shell 14$^a$ form compartments wherein float balls I, II, and III are adapted to operate, the ball I being restricted to move between the stop member 25 and contact plates 21 and 28, the ball II between the stop member 26 and contact plates 22 and 29, and the ball III between the pairs of plates 23, 30 and plates 24, 31. Said balls may be made of any non-corroding metal such as Monel metal or any other suitable material having a relatively low resistance. The shell 14$^a$ and contact plates 28, 29, 30 and 31 may each be connected with a conductor wire 10$^g$ which passes up through a central passage 27$^c$ in member 27 to suitable terminal blocks 32 supported on the upper side of the cap 13$^d$. A cover 33, may be mounted on said cap over the blocks 32 and may be arranged with suitable conduct wire conduits 34 and 35, the former serving to connect with the switch means 11 and the latter joining with a housing 16$^a$ in which the semaphore lights 16 are mounted.

As the water level in the column 13 rises and falls during the operation the device to which the column 13 is attached, the float balls I, II and III make and break the continuity of the various electrical circuits including the sets of plates 21 and 28, 22 and 29, 23 and 30, and 24 and 31. Each set of plates may have curved sections thereof cut out to form a circular shaped opening 36 to receive and to provide better contact with said balls as is shown in Fig. 3. The "make and break" device 14 shown in the drawing is constructed with four float balls at each level, such multiplicity of parts serving to positively assure operation should any one to three balls become ineffective due to any accidental cause and also normally dividing the current to be carried between the several balls of each set.

It is to be understood that the device 14 may be operated by any number of balls from one to four and that the contact plates may be constructed to accommodate any greater or lesser number of balls desired.

The semaphore lights 16 may comprise a lamp socket and lamp 37, one for each of the water levels connected in circuit between the inner plates of the "make and break" device 14 and the switching means 11 by conductor wires 11$^h$ as shown in Fig. 1. Each of said sockets and lamp 37 may be arranged to show through colored windows or "bull's eyes" in the housing 16$^a$ and denoted in Figs. 1 and 2 as "green," "white," "orange" and "red" for indicating the high, medium, low and danger water level respectively.

The feed-water control means 15 (see Fig. 1) may be operated directly from the switch means 11 through conductor wires 10$^i$, and is seen to comprise a solenoid 38 having a plunger 39 which is mounted to actuate a valve 40 connected to the feed-water supply pipe 41. Preferably the valve 40 may be normally open to permit a supply of water to flow through said pipe 41 and the solenoid 38 arranged to be actuated for closing said valve for checking the flow.

Where the feed-water supply source to be controlled is relatively large a motor-operated valve equipment E may replace the valve 40 as shown in Fig. 1ª. Here, the solenoid 38 is seen to actuate a switch, S, connecting the equipment E to a power supply P, for operating the motor M, which drives the valve 40ª. The power transmission from motor M to said valve may include a suitable limiting means L and speed reducing gearing G usually assembled as a unit, for operation in the well known manner. The operation of the equipment will now be clear.

Assuming the switch means 11 set at an ineffective or "off" position, the parts are then as indicated in Fig. 1.

To set the equipment for automatically controlling the water level at the low water mark, the handle 11ᵈ is turned for adjusting the controller 11 to the first setting so that some fingers 19 contact with the bars 11ᶜ. As can be seen from Figs. 1 and 6, the terminals a, d and h of conductor wires 10ª are then interconnected as are those at i and j. This causes the orange light in the switch box 18 to show and is also effective to make only the contact plate 30 live.

If the ball or balls III of the "make and break" device 14 are floating below plates 30 and 23, the valve 40 of the feed-water control means 15 remains wide open and a full supply of water is permitted to flow through pipe 41. As soon as the ball or balls III contact with said plates 30 and 23, a current passes through the said inter-connected conductor wires of the system, flashing the orange light of the semaphore 16 and simultaneously operating the solenoid 38 to shut the valve 40. Thus with the controller set at the low mark the valve 40 is automatically controlled to keep the water in column 13 substantially at the low water level and to indicate the same at the semaphore 16 and at the switch box 18.

Similarly, by setting the controller on the medium position the terminals b, d and h of the conductor wires 10ª are inter-connected, as are i and k, and by turning said controller to the high position, the terminals c, d and h are inter-connected, as are i and l. The medium position of the controller causes the white light to flash and makes only the ball or balls II effective to control the valve 40, whereas the high setting of the controller flashes the green light and makes only ball or balls I effective for controlling the valve 40.

From Fig. 2 it is seen that when the water level is below balls I and II, they rest on shelves 25 and 26 respectively, so as not to contact with the underlying plates.

To make the equipment ineffective the controller is turned to the "off" or the initially described position.

If desired means for indicating a danger low water level or alarm may be provided. This is preferably connected in a circuit which includes the fuse 17, the plates 24 and 31, and ball or balls III which are adapted to contact with the latter when the level of the water in the column 13 falls below the danger mark as shown in Figs. 1 and 2. There is also included in this latter circuit parallelly connected lights which show red, one being in position in the group of lights in the switch box 18 and the other in the group of the semaphore 16. A parallel branch of this circuit may also include a suitable alarm means such as the bell B shown in Fig. 1. If desired an extreme high water alarm may be added similar to the danger low water alarm described above.

Where the water supply is relatively large and the motor controlled valve E is used, the solenoid 38 operates the switch S which indirectly controls the opening and the closing of the valve 40ª as in the case of the directly controlled valve 40 described above.

It will thus be seen that there is provided a device in which the several objects of this invention are achieved and which is well adapted to meet the conditions of practical use. As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:—

1. A feed-water control equipment of the character described comprising an electrical wiring system having manual means for setting the electrical system to automatically operate the equipment at various water levels, and a device actuated by the level of the water to make and break the circuit of the system for controlling said automatic operation.

2. A feed-water control equipment of the character described comprising an electrical wiring system having manual means for setting the equipment to automatically operate at various water levels, a device actuated by the level of the water to make and break the circuit of the system for controlling said automatic operation, and electrical means for indicating the setting of said manually operated means.

3. A feed-water control equipment of the character described comprising an electrical wiring system having manual means for setting the electrical system to automatically operate at various water levels, a device actuated by the level of the water to make and break the circuit of the system for controlling said automatic operation, and a semaphore for indicating the operating water level simultaneously operated with said device.

4. A feed-water control equipment of the character described comprising an electrical wiring system having manual means for setting the electrical system to automatically operate the equipment at various water levels, a device actuated by the level of the water to make and break the circuit of the system for indicating an extreme limit of the water level.

5. A feed-water control equipment of the character described comprising an electrical wiring system having manual means for setting the equipment to automatically operate at various water levels, a device actuated by the level of the water to make and break the circuit of the system for controlling said automatic operation, electrical means for indicating the setting of said manually operated means, and a semaphore for signalling the operation of the device.

6. A feed-water control equipment of the character described comprising an electrical wiring system having manual means for setting the equipment to automatically operate at various water levels, a device actuated by the level of the water to make and break the circuit of the system for controlling said automatic operation, electrical means for indicating the setting of said manually operated means, a semaphore for signalling the operation of the device, and alarm means for indicating an extreme limit of the water level.

7. An electrically operated feed-water control equipment of the character described including an electrical system having a manually operated means for selectively setting the operation of the electrical system for one of a plurality of water levels.

8. An electrically operated feed-water control equipment of the character described including an electrical system having a manually operated means for selectively setting the operation of the equipment for one of a plurality of water levels and electrical means for indicating said setting.

9. An electrically operated feed-water control equipment of the character described including an electrical system having a manually operated means for selectively setting the operation of the electrical system for one of a plurality of water levels, and means for indicating an extreme limit of the water level.

10. An equipment of the character described comprising a feed-water control valve, an electrically operated means for actuating said valve including a manual switch for setting the equipment to automatically operate at a desired water level, and a circuit make and break device operated by the water level for controlling said automatic operation.

11. An equipment of the character described comprising a feed-water control valve, an electrical wiring system, means connected with said system for actuating said valve, an adjustable means for setting the equipment to automatically operate at a desired water level, and a water level device for controlling said automatic operation.

12. An equipment of the character described comprising a feed-water control valve, an electrical wiring system, means connected with said system for actuating said valve, an adjustable means for setting the equipment to automatically operate at a desired water level, a water level device for controlling said automatic operation, and electric lights connected in said system for showing the setting of said adjustable means.

13. An equipment of the character described comprising a feed-water control valve, an electrical wiring system, means connected with said system for actuating said valve, an adjustable means for setting the electrical system to automatically operate the equipment at a desired water level, a water level device for controlling said automatic operation, and electric lights connected in said system effective to indicate the changes of water level in said device.

14. An equipment of the character described comprising a feed-water control valve, an electrical wiring system, means connected with said system for actuating said valve, an adjustable means for setting the electrical system to automatically operate the equipment at a desired water level, a water level device for controlling said automatic operation, and a limit signal for indicating an extreme fluctuation of the water level in said device.

15. An equipment of the character described comprising a feed-water control valve, an electrical wiring system, means connected with said system for actuating said valve, an adjustable means for setting the equipment to automatically operate at a desired water level, a water level device for controlling said automatic operation, and at least one group of electric lights connected in said system for showing each setting of said adjustable means and for indicating each change of water level in said device.

16. An equipment of the character described comprising a feed-water control valve, an electrical wiring system, means connected with said system for actuating said valve, an adjustable means for setting the equipment to automatically operate at a desired water level, a water level device for controlling said automatic operation, at least one group of electric lights connected in said system for showing each setting of said adjustable means and for indicating each change of water level in said device, and a limit signal operated by said device for indicating extreme fluctuation of the water level.

17. In an equipment of the character described, an electrically operated valve including a device comprising a tubular casing adapted to serve as a water column, a plurality of current carrying plates positioned at various levels in said casing, and metallic float balls disposed between said plates for contacting therewith on raising of the water level in said casing, said balls being adapted to close an electric circuit controlling said equipment.

18. In an equipment of the character described, an electrically operated valve including a device comprising a tubular casing adapted to serve as a water column, a plurality of current carrying plates positioned at various levels in said casing, and metallic float balls disposed between said plates for contacting therewith on raising and lowering of the water level in said casing.

19. In an equipment of the character described, an electrically operated valve including a device comprising a tubular casing adapted to serve as a water column, a plurality of current carrying plates positioned at various levels in said casing, metallic float balls disposed between said plates for contacting therewith on raising and lowering of the water level in said casing, said balls being adapted to close an electric circuit controlling said equipment, and switch means for selectively making the ball at any one level effective to control the equipment.

20. In an equipment of the character described, an electrically operated valve including a device comprising a tubular casing adapted to serve as a water column, a shell in said casing, current carrying plates extending from said shell at various levels in said casing, other current carrying plates aligned with the first mentioned plates and spaced therefrom and metallic float balls disposed between the plates for contacting with those in alignment on raising of the water level in said casing, said plates and balls forming portion of an electrical circuit for controlling said equipment.

21. In an equipment of the character described, an electrically operated valve including a device comprising a tubular casing adapted to serve as a water column, a shell in said casing, current carrying plates extending from said shell at various levels in said casing, other current carrying plates aligned with the first mentioned plates and spaced therefrom and metallic float balls disposed between the plates for contacting with those in alignment on raising of the water level in said casing, said plates and balls forming portion of an electrical circuit for controlling said equipment, the aligned plates below the lowest ball being adapted to close a circuit on lowering of the water level in the casing.

22. In an equipment of the character described, an electrically operated valve including a device comprising a tubular casing adapted to serve as a water column, a shell in said casing, current carrying plates extending from said shell at various levels in said casing, other current carrying plates aligned with the first mentioned plates and spaced therefrom, metallic float balls disposed between the plates for contacting with those in alignment on raising of the water level in said casing, said plates and balls forming portion of an electrical circuit for controlling said equipment and a manually operated switch in the electrical circuit for selectively making the ball at any desired level effective to control the equipment.

In testimony whereof I affix my signature.

JOHN H. DONAHUE.